3,194,635
METHOD FOR THE PRODUCTION OF ALUMINUM REFRACTORY MATERIAL
David T. Lapp, Chippawa, Ontario, and Howard J. Bartlett, Niagara Falls, Ontario, Canada, assignors to Norton Company, Worcester, Mass., a corporation of Massachusetts
No Drawing. Filed July 18, 1961, Ser. No. 124,789
7 Claims. (Cl. 23—192)

This invention relates to the production of refractory materials. More particularly, this invention relates to the preparation of aluminum nitride refractory material.

Refractories primarily are materials which can withstand high temperatures. Their essential function is to serve as structural materials and thus their usefulness depends on the ability to maintain their mechanical function at these high temperatures. There is a constant search for new refractories which can fulfill special needs.

For example, better refractories are needed in the metal industry where molten metals such as aluminum are produced and handled. The physical forms of refractory materials which are required include bricks, plates, tubes, crucibles and other castable shapes. Many known refractories produced in these forms do not have a prolonged service life.

Aluminum nitride shows promise as a good refractory material but its production has been limited and costly. Most methods of preparation known heretofore have been for small quantities of high purity material which in general were made by employing vacuum techniques; hence the products have not been able to compete in the refractory field. Furthermore, the aluminum nitride produced has proven to be unstable, decomposing in moisture to release ammonia, and it has been considered unfeasible to prepare refractory ware from aluminum nitride without the inclusion of a binding material.

It is therefore an object of this invention to provide an economical method for the production of aluminum nitride refractory material.

It is another object of this invention to provide such a method which may be conducted in conventional apparatus without the need for specialized equipment.

It is still another object of this invention to provide an aluminum nitride refractory material suitable for the fabrication of various physical forms.

It is a further object of this invention to provide an aluminum nitride refractory material which is stable in the presence of moisture.

It is a still further object of this invention to provide an aluminum nitride refractory material which is especially suited for use in the metal industry with, for example, molten aluminum.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that these objects may be attained by heating together metallic aluminum and carbon in the presence of nitrogen gas. The aluminum metal is preferably finely divided and of substantial purity. The metallic aluminum is mixed with finely divided carbon, e.g., graphite powder and heated in a conventional furnace in an atmosphere of nitrogen. The product may then be fired under an argon atmosphere to improve stability and increase the purity thereof.

More particularly, metallic aluminum is thoroughly blended with free carbon, e.g., lampblack, graphite or coke. The aluminum used is of a fine particle size ranging between about 30 and 400 mesh, one effective size being about 200 mesh. The carbon is also preferably finely divided, a particle size of 325 mesh being especially effective. The mixture is heated in a conventional furnace, for example, a kiln, at a temperature between about 1000° and 1500° C., a temperature of 1200° C. being particularly suitable. The time of heating may vary between about 15 and 90 minutes depending somewhat upon the temperature and particle size of the raw materials, and the mix is then allowed to cool. An excess of nitrogen is passed through the mix during both the reaction and cooling stages. When a product of stability is desirable, the product is then fired at a temperature between 2050° and 2150° C., e.g., 2100° C., under an argon atmosphere. This treatment renders the product stable in the presence of moisture and also increases its purity by driving off unreacted materials. In the above procedures, commercial or purified nitrogen, in the synthesis step, and argon, in the stabilization step, may be used.

The aluminum nitride product, whether stabilized or unstabilized, may be hot pressed or cold pressed and sintered. It may be formed into refractory ware by itself or with other refractory materials such as titanium boride, boron carbide and silicon carbide as additives. Also refractory ware of other material may be bonded with aluminum nitride.

The carbon may be added to the mix in the form of lampblack, graphite or coke, and constitutes from about 5 to about 20% by weight of the reaction mixture, with the preferred amount being from 5 to 10% by weight. When carbon additions approach 30% they tend to yield lower grade products. Although the carbon does not enter, as such, into the nitriding reaction, it has been found essential for the reaction to progress, since its function is to remove the oxide layer by reducing it to aluminum metal.

In the following example, and throughout the specification and claims, all parts are parts by weight unless otherwise specified.

*Example 1*

45 grams (9 parts) of 200 mesh aluminum powder and 5 grams (1 part) of 325 mesh graphite powder were thoroughly blended, placed in a graphite container and heated in a molding furnace at a temperature of 1000° C. for 15 minutes. An excess of nitrogen was passed through the mix during the reaction and cooling stages. The product had the following chemical analysis:

| | Percent |
|---|---|
| Al | 66.41 |
| N | 24.20 |
| Free C | 0.76 |
| Fe | 0.52 |
| Si | 0.22 |
| Ti | 0.04 |
| | 92.15 |

The product was fired at 2100° C. under an argon atmosphere, and was suitable for hot pressing or cold pressing and sintering into refractory ware.

In Examples 2–8, the same procedure was utilized as set forth above in Example 1. In these examples, the particle size of aluminum is listed as fine and coarse. The particle size breakdown for these size designations is as follows: fine—1% on 100 mesh, 12% on 325 mesh and 87% through 325 mesh; coarse—46% on 35 mesh, 45% on 65 mesh and 9% through 65 mesh. The particle size of graphite is listed as T325 and T100 and is to be read as through 325 mesh and through 100 mesh respectively.

| Example | Percent C by Weight | Temp., °C. | Time at Temp., min. | Particle Size | | Analysis | | |
|---|---|---|---|---|---|---|---|---|
| | | | | Aluminum | Graphite | N | Al | Free C |
| 2 | 10 | 1,200 | 90 | Fine | T325 | 24.16 | 59.93 | 2.34 |
| 3 | 10 | 1,200 | 90 | Coarse | T325 | 25.79 | 64.64 | 5.58 |
| 4 | 10 | 1,500 | 60 | Coarse | T325 | 23.40 | 69.78 | 1.72 |
| 5 | 5 | 1,200 | 90 | Fine | T325 | 26.44 | 69.14 | 0.85 |
| 6 | 5 | 1,200 | 90 | Coarse | T325 | 27.64 | 66.05 | 3.73 |
| 7 | 10 | 1,200 | 90 | Coarse | T100 | 24.27 | 68.00 | 1.78 |
| 8 | 10 | 1,200 | 90 | Fine | T100 | 25.07 | 66.70 | 4.64 |

What is claimed is:

1. A method for the production of aluminum nitride refractory material which comprises forming a mixture of finely divided aluminum with finely divided carbon in an amount of about 5% to 20% by weight of the mixture, heating the mixture at a temperature between about 1000° and 1500° C. in an atmosphere of excess nitrogen, continuing said heating for a time effective to convert the aluminum to aluminum nitride, and cooling the mixture in the nitrogen atmosphere.

2. The method according to claim 1 wherein the aluminum has a particle size between about 30 and 400 mesh.

3. The method according to claim 1 wherein the carbon has a particle size between about 100 and 325 mesh.

4. The method according to claim 1 wherein the carbon is selected from the group consisting of graphite, lampblack and coke.

5. The method according to claim 1 wherein the mixture is heated at a temperature of about 1200° C.

6. The method according to claim 1 wherein the mixture is heated for a time between about 15 and 90 minutes.

7. The method according to claim 1 wherein the aluminum nitride product is thereafter fired at a temperature between about 2050° and 2150° C. in an atmosphere of argon for a time effective to stabilize the aluminum nitride against reaction with moisture.

References Cited by the Examiner
UNITED STATES PATENTS

| 987,408 | 3/11 | Serpek | 23—192 |
| 1,129,509 | 2/15 | Peacock | 23—192 X |
| 1,158,899 | 11/15 | Coutagne | 23—192 X |
| 3,128,153 | 4/64 | Addiamiano | 23—191 |

FOREIGN PATENTS 1,106,296 5/61 Germany.

OTHER REFERENCES

Mellor: Comprehensive Treatise on Inorganic and Theoretical Chemistry, Longmans Green and Co., New York, 1928, vol. VIII, pages 113 and 114.

MAURICE A. BRINDISI, *Primary Examiner.*
GEORGE D. MITCHELL, *Examiner.*